(12) United States Patent
Auernhammer et al.

(10) Patent No.: US 12,012,950 B2
(45) Date of Patent: Jun. 18, 2024

(54) DIAPHRAGM ASSEMBLY

(71) Applicant: Alfmeier Präzision SE, Treuchtlingen (DE)

(72) Inventors: Helmut Auernhammer, Höttingen (DE); Erich Dörfler, Landsberg (DE)

(73) Assignee: ALFMEIER PRÄZISION SE, Treuchtlingen (DE)

( * ) Notice: Subject to any disclaimer, the term of this patent is extended or adjusted under 35 U.S.C. 154(b) by 7 days.

(21) Appl. No.: 17/496,094

(22) Filed: Oct. 7, 2021

(65) Prior Publication Data

US 2022/0106955 A1 Apr. 7, 2022

(30) Foreign Application Priority Data

Oct. 7, 2020 (DE) ................ 10 2020 126 241.8

(51) Int. Cl.
*F04B 45/04* (2006.01)
*B60N 2/66* (2006.01)

(52) U.S. Cl.
CPC ............ *F04B 45/04* (2013.01); *B60N 2/665* (2015.04)

(58) Field of Classification Search
CPC .. F04B 43/054; F04B 43/0063; F04B 43/026; F04B 45/043; F15B 15/10; F16J 3/02
See application file for complete search history.

(56) References Cited

U.S. PATENT DOCUMENTS

| | | | | | |
|---|---|---|---|---|---|
| 2,658,526 | A | * | 11/1953 | Porter | F16J 3/02 92/100 |
| 3,021,792 | A | * | 2/1962 | Johnson | F02M 1/00 92/99 |
| 3,151,568 | A | * | 10/1964 | McArthur | F02M 37/04 92/100 |
| 3,188,970 | A | * | 6/1965 | Harry | F04B 43/0054 92/100 |
| 4,086,036 | A | * | 4/1978 | Hagen | F04B 43/0054 92/99 |
| 4,915,018 | A | * | 4/1990 | Scott | F16J 3/06 92/96 |

(Continued)

FOREIGN PATENT DOCUMENTS

DE 41 19 228 A1 12/1992
DE 195 25 557 A1 1/1997
(Continued)

OTHER PUBLICATIONS

German Office Action dated Jul. 14, 2021 with English translation.
(Continued)

*Primary Examiner* — Kenneth Bomberg
*Assistant Examiner* — Matthew Wiblin
(74) *Attorney, Agent, or Firm* — JK Intellectual Property Law, PA

(57) ABSTRACT

A diaphragm assembly includes a diaphragm defining a volume space; a diaphragm body extending from the diaphragm; a transition region from the diaphragm to the diaphragm body located on an outer side of the diaphragm and the diaphragm body facing away from the volume space; and a convex abutment contour arranged adjacent to the transition region. Related seat and pump assemblies are also disclosed.

21 Claims, 8 Drawing Sheets

(56) References Cited

U.S. PATENT DOCUMENTS

| | | | | | |
|---|---|---|---|---|---|
| 5,776,098 | A | * | 7/1998 | Silver | F04B 43/0063 604/74 |
| 5,996,470 | A | * | 12/1999 | Eady | F04B 43/0054 92/99 |
| 6,158,327 | A | * | 12/2000 | Huss | F04B 43/0063 92/100 |
| 7,070,400 | B2 | * | 7/2006 | Greter | F04B 45/04 417/415 |
| 7,363,850 | B2 | | 4/2008 | Becker | |
| 8,256,341 | B2 | * | 9/2012 | Rhoads | F16J 3/02 92/99 |
| 2015/0056089 | A1 | * | 2/2015 | Gledhill, III | B29C 45/14311 277/634 |
| 2016/0348670 | A1 | * | 12/2016 | Sakohira | F04B 45/047 |

FOREIGN PATENT DOCUMENTS

| | | |
|---|---|---|
| DE | 196 47 882 A1 | 5/1998 |
| DE | 103 12 899 A1 | 10/2004 |
| DE | 10 2011 015 532 A1 | 10/2012 |
| EP | 1 956 242 A1 | 8/2008 |
| JP | 2009-293 426 | 12/2009 |

OTHER PUBLICATIONS

Office Action for German Application No. 10 2020 126 241.8, dated Jul. 17, 2023, with English translation.

* cited by examiner

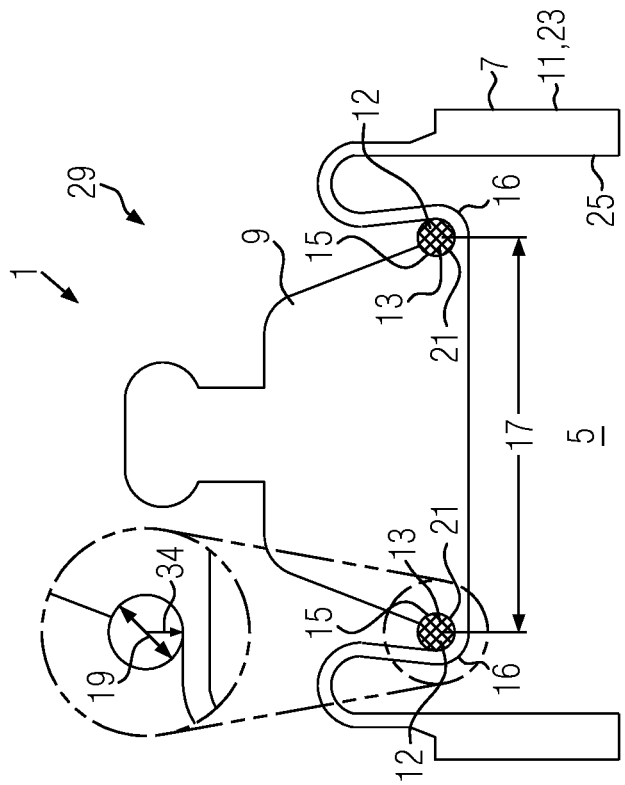
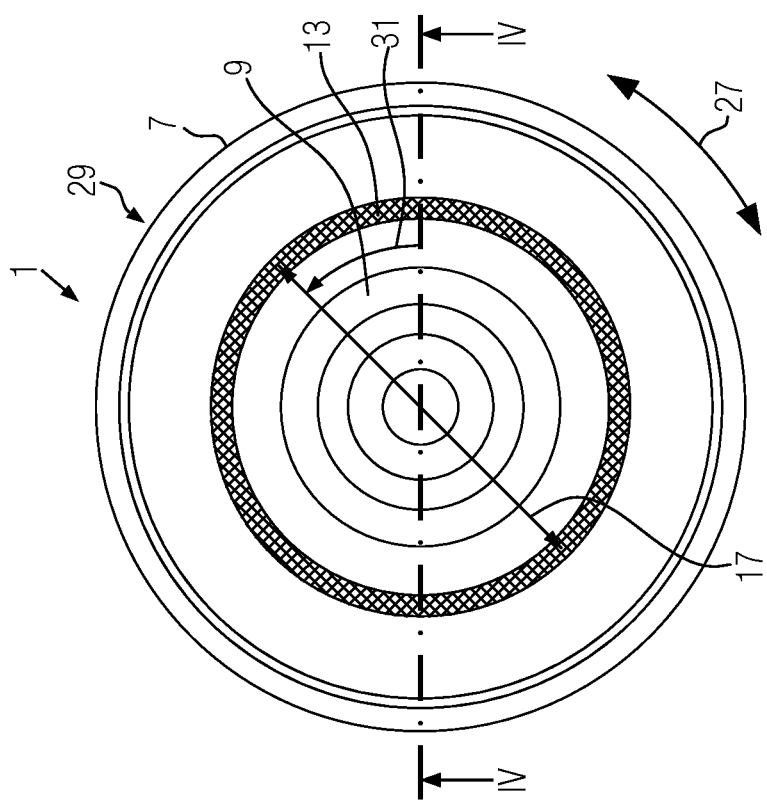
FIG. 4
FIG. 3

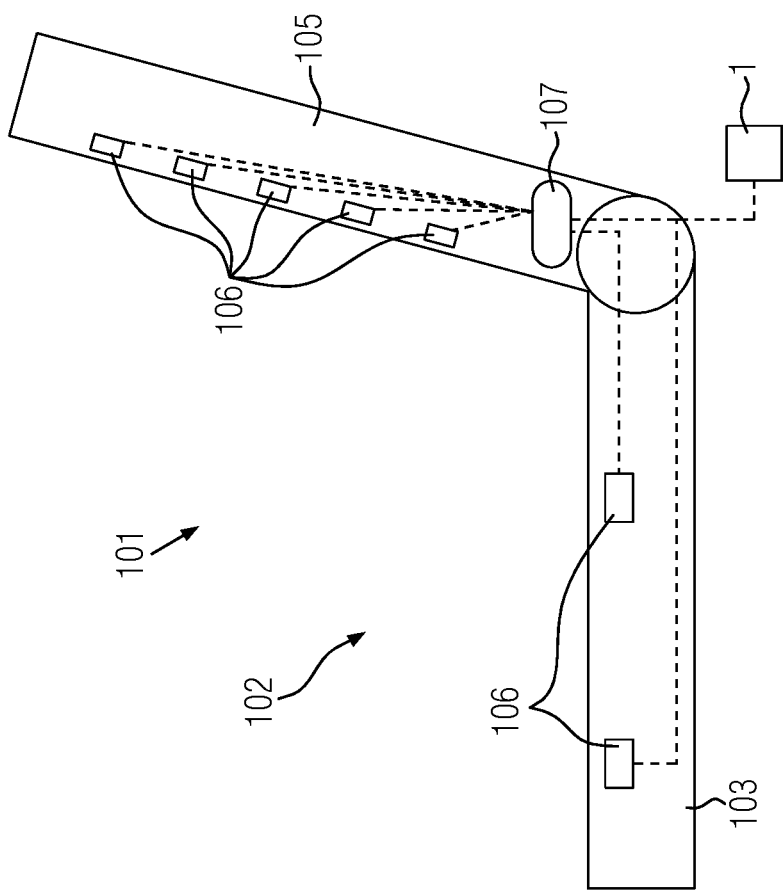

DIAPHRAGM ASSEMBLY

CROSS-REFERENCE TO RELATED APPLICATIONS

This application claims benefit to German Patent Application Number 10 2020 126 241.8, dated Oct. 7, 2020, which is incorporated in its entirety by reference herein.

TECHNICAL FIELD

The disclosure relates generally to a diaphragm assembly with a diaphragm defining a volume space and a diaphragm body.

BACKGROUND

Diaphragm assemblies of the type mentioned above are widely used in pump assemblies or in seat assemblies. It is of particular interest to extend the service life of the diaphragm or to reduce loads on the diaphragm, respectively.

DE 39 01 071 A1 describes a plunger pump with a rolling diaphragm. The rolling diaphragm is arranged between an outer circumferential surface on the plunger side and an inner circumferential surface on the housing side that is radially spaced therefrom with two annularly connected sections resting on these circumferential surfaces and is alternately rolled up and down on the circumferential surfaces with the plunger strokes. The rolling diaphragm is arranged as a secondary seal so that the rolling diaphragm according to DE 39 01 071 A1 is exposed to low pressures.

DE 40 07 932 A1 describes a diaphragm pump with a shaped diaphragm. At the outer edge of the central region of the shaped diaphragm, an approximately annular pivot zone forms the transition from the central region to the diaphragm edge region. Furthermore, ribs or stabilizing projections oriented towards the underside of the diaphragm are provided on the underside of the diaphragm, at least in its central region or its edge region. In accordance with DE 40 07 932 A1, this means that, all other conditions being the same, a smaller diaphragm wall thickness can be used which leads to a reduction in the flexing work and a longer service life of the diaphragm.

DE 22 11 096 describes a diaphragm pump for generating a vacuum, where, on the wall of the pump chamber facing the diaphragm in the region where the diaphragm finally approaches the pump chamber wall at top dead center, the latter has a concavity projecting slightly into the pump chamber.

Furthermore, DE 10 2011 015 532 A1 discloses a vehicle seat and a method for controlling vehicle seat elements that can be pressurized.

Prior art with regard to diaphragm assemblies therefore describes limiting the diaphragm motion or structuring the diaphragm. In particular with large diaphragm deflections, however, the structured regions would be particularly stressed, which would ultimately lead to a reduction in the service life of the diaphragm. A reduction in the service life of the diaphragm would be further increased if the diaphragm were not only deflected linearly but also tilted, and compressions and/or stretching over the diaphragm surface would then occur.

SUMMARY

It is the object of the disclosure to provide a diaphragm assembly which has a long service life and can be arranged so as to be movable in different directions and which allows for large diaphragm deflections.

This object is solved according to the present disclosure by a diaphragm assembly, according to which a convex abutment contour is provided which is arranged adjacent to a transition region from the diaphragm to the diaphragm body on an outer side of the diaphragm assembly facing away from the volume space.

This has the technical effect, in particular, of relieving the diaphragm for the reason that the convex abutment contour acts upon the diaphragm in manner limiting bending.

A material of the diaphragm can advantageously comprise a film or the material of the diaphragm can comprise a textile, where the material of the diaphragm can comprise an outer side and an inner side. Even more advantageously, the material of the diaphragm can comprise rubber.

Furthermore, the material of the diaphragm comprising the textile or the material of the diaphragm comprising the film can be coated with rubber on the outer side or the inner side of the material of the diaphragm. The material of the diaphragm comprising the textile or the material of the diaphragm comprising the film can furthermore be coated with rubber on the outer side and the inner side of the material of the diaphragm. Alternatively, the material of the diaphragm comprising rubber can be coated with the film on the outer side or the inner side of the material of the diaphragm or the material of the diaphragm comprising rubber can be coated with the textile on the outer side or the inner side of the material of the diaphragm. Alternatively, the material of the diaphragm comprising rubber can be coated with the film on the outer side and the inner side of the material of the diaphragm or the material of the diaphragm comprising rubber can be coated with the textile on the outer side and the inner side of the material of the diaphragm.

Coating the outer side or inner side of the material of the diaphragm comprising rubber with either the film or the textile and the other outer side or inner side of the material of the diaphragm comprising rubber with the respective other film or textile represents a further embodiment of the diaphragm.

Yet another embodiment of the material of the diaphragm can comprise any sequence of layers made of rubber and/or textile and/or film.

In particular, the diaphragm body can comprise, for example, thermoplastic material, thermosetting plastic material, or rubber as material and otherwise be formed to be hollow. Likewise, the diaphragm body can be formed as a volume body, i.e. not hollow. Furthermore, a hardness of the material of the diaphragm body can correspond to a hardness of the material of the diaphragm or the hardness of the material of the diaphragm body can differ from the hardness of the material of the diaphragm. The hardness of the material of the diaphragm body can preferably be greater than the hardness of the material of the diaphragm.

In one embodiment, the diaphragm and the diaphragm body can be formed integrally.

In a further embodiment, the diaphragm and the diaphragm body can be formed separately and connected to one another in a fluid-tight manner.

A fluid-tight connection in one embodiment where the diaphragm and the diaphragm body are implemented separately can comprise adhesive bonding or can preferably comprise vulcanization. The vulcanization can preferably be carried out in a temperature range between 100° C. and 300° C. Adhesive bonding can preferably comprise the use of single-part and multi-part adhesives. In particular, in the embodiment of a separately formed diaphragm and diaphragm body, a fluid-tight connection of the diaphragm and the diaphragm body can be obtained by thermoplastic welding of the diaphragm and the diaphragm body. Furthermore, in the embodiment of the diaphragm and the diaphragm body being formed separately, the fluid-tight connection of the diaphragm and the diaphragm body can comprise ultrasonic welding.

In particular, in an integrally formed embodiment of the diaphragm and the diaphragm body, the diaphragm can be produced with the diaphragm body in a casting method, where the casting process can comprise in particular rubber. The casting method can comprise in particular injection molding. The casting method can furthermore comprise thermoplastic injection molding or yet further comprise elastomer injection molding or, alternatively, comprise thermoset injection molding.

In one embodiment, the convex abutment contour can be provided by a ring encircling the diaphragm body.

In one embodiment, the ring can be formed separately from the diaphragm assembly or the ring and the diaphragm assembly can be formed integrally.

In one embodiment in which the ring and the diaphragm assembly are formed integrally, the ring can be embedded at least in part in the diaphragm body and optionally comprise notches for minimizing material stresses in the region of the diaphragm.

In one embodiment, the convex abutment contour can be formed as a smooth surface. A surface is "smooth" in the sense of minimal surface roughness, where the surface roughness can be identified according to an area-related roughness value in the sense of the DIN EN ISO 25178 series of standards. According to the disclosure, the area-related roughness value should not exceed a value of 100 micrometers and preferably be less than 100 micrometers so that the surface can be viewed as being "smooth".

The ring can preferably be an O-ring and comprise rubber or plastic material. Alternatively, the ring can be metallic and preferably comprise copper, stainless steel, or brass.

In particular, the O-ring made of plastic material can comprise at least one injection point which can be arranged on an inner edge of the O-ring. The O-ring can preferably be produced from plastic material in an injection molding process. Alternatively, the O-ring can be produced in a thermoplastic injection molding process or the O-ring can be produced in an elastomer injection molding process or the O-ring can be produced in a thermoset injection molding process.

In particular, the O-ring can comprise the material ethylene-propylene-diene rubber (EPDM) or the material polybutylene terephthalate (PBT).

In one embodiment, the cord cross section of the ring (or O-ring) can have a diameter in a range from 0.5 mm to 20 mm.

In one embodiment, a diameter of the ring (or O-ring) can be in a range from 5 mm to 100 mm, preferably in a range from 5 to 50 mm.

In one embodiment, the diaphragm can comprise an outer and an inner surface, where the diaphragm body can furthermore be arranged in a first position or in a second position, where the diaphragm can abut at least in part against the convex abutment contour when the diaphragm body is disposed in the first position, where the diaphragm can furthermore surround the convex abutment contour at least in part when the diaphragm body is disposed in the second position.

Optionally, the diaphragm body can furthermore be disposed in a third position between the first and the second position, where the diaphragm can surround the convex abutment contour at least in part when the diaphragm body is disposed in the third position.

The convex abutment contour, which is surrounded by the diaphragm at least in part, can preferably be formed as a smooth surface. A surface is "smooth" in the sense of minimal surface roughness, where the surface roughness can be identified according to an area-related roughness value in the sense of the DIN EN ISO 25178 series of standards. According to the disclosure, the area-related roughness value should not exceed a value of 100 micrometers and preferably be less than 100 micrometers so that the surface can be viewed as being "smooth".

The diaphragm body can preferably also be formed to be tiltable in the first, the second, or the third position relative to the diaphragm. Tilting can preferably take place by an external action upon the diaphragm body and can also take place in that an end of the diaphragm body disposed on the outer side of the diaphragm assembly is acted upon.

The diaphragm body can optionally be formed to perform a linear motion, where the linear motion displaces the diaphragm body along a longitudinal axis from the first position to the second position or from the second position to the first position.

In particular, the diaphragm surrounding the convex abutment contour at least in part can have a bending radius which can correspond to at least a radius of a cord cross section of the convex abutment contour.

In particular, the outer surface of the diaphragm can be configured to lose contact with at least a partial section of the convex abutment contour when the diaphragm body is disposed in the first position.

In particular, in a tilted arrangement of the diaphragm body, the outer surface of the diaphragm can be configured to surround the convex abutment contour at least in part.

In a further embodiment, the diaphragm assembly can be arranged in a seat assembly. In particular, the seat assembly can comprise a seat, in particular a vehicle seat, where the seat can comprise the diaphragm assembly and an actuator which can be configured to be in engagement with the diaphragm body and furthermore can be configured to perform a motion with the diaphragm that compresses the volume space.

In a preferred embodiment, the actuator can act upon the end of the diaphragm body disposed on the outer side of the diaphragm assembly. In particular, the end of the diaphragm body disposed on the outer side of the diaphragm assembly can be connected to the actuator in a rotationally fixed manner, or the end of the diaphragm body disposed on the outer side of the diaphragm assembly can be mounted to be rotatable in the actuator.

The compressing motion can comprise that the actuator performs a motion, where the actuator can furthermore be configured to transform a rotational motion into a translatory motion. The translatory motion can preferably lead to the diaphragm body that is connected to the actuator performing a translatory motion and the actuator being able to additionally guide the diaphragm body through an angle range which can comprise angle values within an interval of 0 degrees to 40 degrees, where the angle values can be included between an axis of symmetry of the diaphragm body and a lateral deflection direction of the diaphragm body. In particular, the motion of the actuator can be a periodic motion or the motion of the actuator can be an accelerated motion or the motion of the actuator can be an accelerated and periodic motion.

In one embodiment, the actuator can be driven electrically or, in a further embodiment, the actuator can be driven pneumatically.

The actuator can preferably perform a stroke motion which is transmitted to the diaphragm body.

The volume space can preferably comprise a volume in a range from 0.2 ml to 5 l.

In one embodiment, the volume space can be filled with gas, where the gas can preferably comprise air and/or nitrogen and/or can furthermore comprise oxygen, hydrogen and/or hydrocarbons for adjusting an effect of the compressive motion.

In a further embodiment, the volume space can be filled with liquid, where the liquid can comprise a viscosity for adjusting an effect of the compressive motion.

In yet a further embodiment, the volume space can be filled both with the gas and with the liquid for adjusting an effect of the compressive motion.

In a further aspect, a pump assembly can comprise at least one diaphragm assembly in one of the variants described above.

Furthermore, the pump assembly can comprise at least one valve, where the valve can be a flap valve and can comprise rubber. The valve can be arranged with a first side of the valve adjacent to the volume space and close the latter when the valve is in a closed state. The valve can be arranged with a second side of the valve at a duct adjacent to the volume space.

The duct can comprise at least two ends, where a first end can be coupled to the diaphragm assembly. In particular, the valve can be opened or closed by a pressure difference between the volume space and the duct. If a pressure in the volume space is greater than a pressure in the duct, then the valve can be opened in the direction of the duct. If a pressure in the duct is greater than a pressure in the volume space, then the valve can be opened in the direction of the volume space.

A second end of the duct can be coupled to a switchable valve, where the switchable valve can be configured to fill or vent the duct. The duct can be configured to discharge a fluid flowing out of the volume space or the duct can be configured to provide a fluid for flowing into the volume space.

In particular, the pump can have a compressing effect. Optionally, the pump can be configured as a feed pump.

BRIEF DESCRIPTION OF THE DRAWINGS

The disclosed subject matter shall hereafter be further described using exemplary embodiments which are illustrated in the figures.

FIG. 3 is a top view showing the diaphragm assembly according to the disclosure in a second position.

FIG. 4 is a sectional view through the diaphragm assembly according to the disclosure from FIG. 3 along a plane which is identified by the dashed line IV-IV in FIG. 3 and projects perpendicularly from the image plane.

FIG. 9 is a schematic side view showing a seat assembly with a seat surface and a backrest and at least one diaphragm assembly according to the disclosure arranged therein.

DETAILED DESCRIPTION

Figure 1:
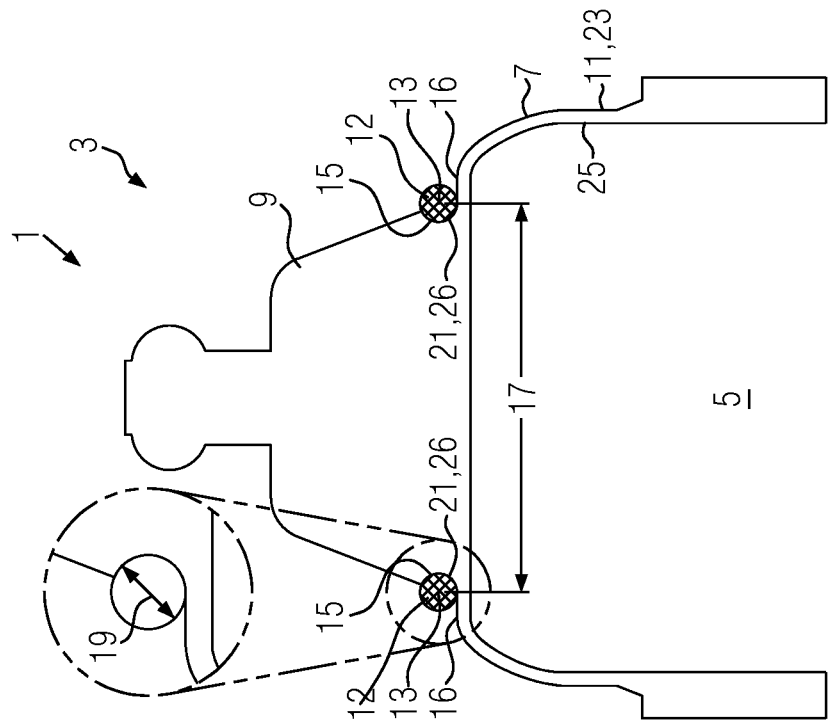
FIG. 1 is a top view showing a diaphragm assembly according to the disclosure which is arranged in a first position.

Corresponding components illustrated in the above figures are identified in the figures and in the following detailed description of the figures using the same reference characters. Furthermore, alternative components with a corresponding effect like the components of the diaphragm assembly described above and hereafter are considered to be exchangeable with the components of the diaphragm assembly described above and hereafter.

FIG. 1 shows an embodiment of a diaphragm assembly 1 according to the disclosure, where diaphragm assembly 1 is arranged in a first position 3. This is further shown in FIG. 2 by way of the sectional view illustrated there.

Figure 2:
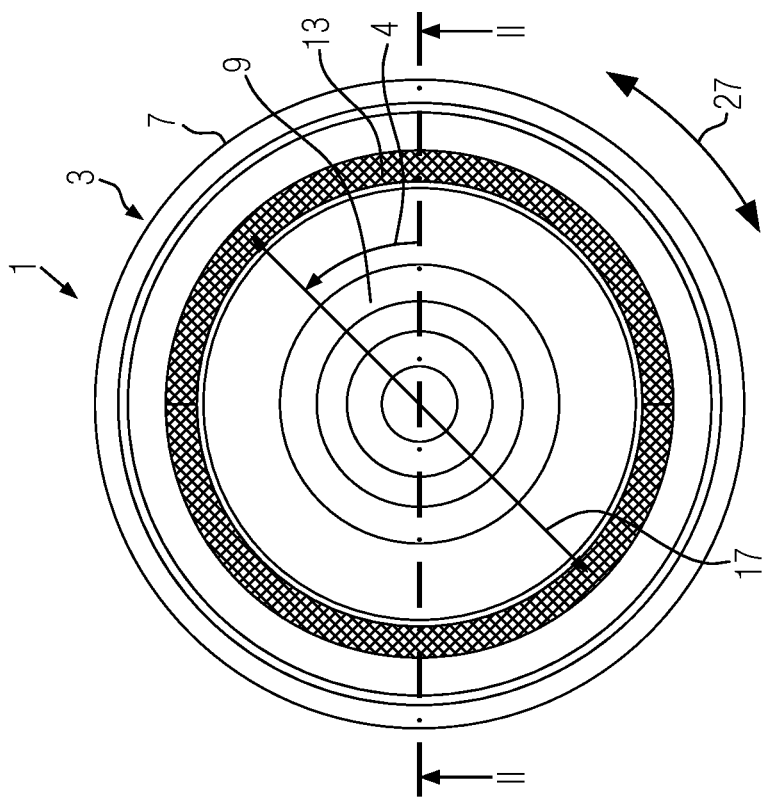
FIG. 2 is a sectional view through the diaphragm assembly according to the disclosure from FIG. 1 along a plane which is identified by the dashed line II-II in FIG. 1 and projects perpendicularly from the image plane.

FIG. 2 there shows a sectional view along a plane which is identified in FIG. 1 by the dashed line II-II and projects perpendicularly from the image plane. The sectional view shown in FIG. 2 is to be understood to be a radially symmetrical sectional view through diaphragm assembly 1. This means in particular that the plane which is identified by the dashed line II-II in FIG. 1 can be rotated about any random angle 4 and a sectional view along this rotated plane would again correspond to the sectional view shown in FIG. 2.

Diaphragm assembly 1 comprises a diaphragm 7 defining a volume space 5 and a diaphragm body 9, where diaphragm body 9 closes off volume space 5 in a fluid-tight manner. Above-described first position 3 of diaphragm assembly 1 means in particular that diaphragm body 9 is arranged in a first position 3. Diaphragm assembly 1 can be elongate in first position 3, where diaphragm body 9 there projects from volume space 5. A convex abutment contour 12 is arranged on an outer side 11 of diaphragm assembly 1 facing away from volume space 5 and can comprise a ring 13 encircling diaphragm body 9 or be formed by the latter. Ring 13 can there be formed separately from diaphragm assembly 1. Furthermore, ring 13 can engage in a groove 15, where groove 15 can encircle diaphragm body 9 and be configured as a concavity 15 of diaphragm body 9.

Diaphragm assembly 1 described above can be formed integrally and comprise diaphragm 7 and diaphragm body 9 as an integrally formed assembly, where diaphragm body 9 can close off volume space 5 in a fluid-tight manner. An integrally formed embodiment of diaphragm 7 and diaphragm body 9 can there be produced in particular by the casting method described above.

Alternatively, diaphragm assembly 1 can also be formed by diaphragm 7 and diaphragm body 9, where diaphragm 7 and diaphragm body 9 can be formed separately. Diaphragm 7 and diaphragm body 9 can be connected to one another in a fluid-tight manner. Diaphragm body 9 can then close off volume space 5 in a fluid-tight manner.

Furthermore, diaphragm assembly 1 can be arranged at least in part in a volume-defining housing (not shown in detail), where the housing can be configured to define a volume of diaphragm assembly 1. In particular, the housing can be configured to define an expansion of diaphragm assembly 1. The housing can preferably be configured to define volume space 5 of diaphragm 7.

The fluid-tight connection of diaphragm 7 and diaphragm body 9 can comprise adhesive bonding or can preferably comprise vulcanization. The vulcanization can preferably be carried out in a temperature range between 100° C. and 300° C. In particular, a fluid-tight connection between diaphragm 7 and diaphragm body 9 can be produced by vulcanization adjacent to the location of convex abutment contour 12. The possibility can be provided there of making groove 15 assume a desired shape. The desired shape of groove 15 can comprise at least one concavity in diaphragm assembly 1. The vulcanization can preferably be carried out in a transition region 16 from diaphragm 7 to diaphragm body 9 on outer side 11 of diaphragm assembly 1 facing away from volume space 5. As a result, groove 15 can be arranged in transition region 16; groove 15 can preferably be arranged as a concavity of diaphragm body 9. In the fluid-tight connection by way of adhesive bonding, the adhesive bonding can comprise adhesively bonding diaphragm 7 and diaphragm body 9 in transition region 16 from diaphragm 7 to diaphragm body 9 on outer side 11 of diaphragm assembly 1 facing away from volume space 5. The desired shape of groove 15 can be formed already prior to diaphragm 7 and diaphragm body 9 being adhesively bonded together. In particular, the desired shape of groove 15 can be formed in transition region 16, groove 15 can preferably be arranged as a concavity of diaphragm body 9.

The adhesive bonding can preferably comprise the use of single-part or alternatively multi-part adhesives. In particular, if diaphragm 7 and diaphragm body 9 are formed separately, then a fluid-tight connection of diaphragm 7 and diaphragm body 9 can be obtained by thermoplastic welding of diaphragm 7 and diaphragm body 9. Furthermore, if diaphragm 7 and diaphragm body 9 are formed separately, then the fluid-tight connection of diaphragm 7 and diaphragm body 9 can comprise ultrasonic welding. With the fluid-tight connection by way of one of the aforementioned welding processes, as with adhesive bonding, the desired shape of groove 15 can be provided already prior to diaphragm 7 and diaphragm body 9 being welded together in transition region 16 of diaphragm 7 to diaphragm body 9 on outer side 11 of diaphragm assembly 1 facing away from volume space 5. Groove 15 can preferably be provided as a concavity of diaphragm body 9.

Ring 13 has a diameter 17 which can be in a range from 5 mm to 100 mm. Ring 13 further comprises a cord cross section 19, where cord cross section 19 can have a diameter in a range from 0.5 mm to 20 mm. Ring 13 can furthermore comprise a surface section 21. Surface section 21 is to there to be understood to mean any section of an outer surface of ring 13 and is not to be understood to be restricted to only one surface section. Furthermore, surface section 21 can form convex abutment contour 12. Surface section 21 can be configured to engage in groove 15. Preferably, however, diaphragm 7 can be configured to abut at least in part against surface section 21. Furthermore, surface section 21 can be configured as a smooth surface, preferably in the region that engages in groove 15 and in the region against which diaphragm 7 abuts at least in part. The section of ring 13 disposed opposite smooth surface section 21 can either also be formed to have a smooth surface or can also have a rough surface. Ring 13 can preferably be produced inexpensively in that at least surface section 21 is formed as a smooth surface, in particular by polishing, where other surface sections of ring 13 can remain untreated.

Further details of an engagement of ring 13 in groove 15 and the partial abutment of diaphragm 7 against surface section 21 of ring 13 can be explained on the basis of the geometry of diaphragm 7. Diaphragm 7 further comprises an outer 23 and an inner surface 25. In first position 3 of diaphragm body 9, ring 13 can ideally abut completely against outer surface 23 of diaphragm 7. Alternatively, ring 13 does not have to encircle outer surface 23 of diaphragm 7 in complete abutment, but outer surface 23 can lose contact with at least a partial section 26 of surface section 21 of ring 13 when diaphragm body 9 is arranged in the first position. In particular, outer surface 23 can lose contact at least to partial section 26 of surface portion 21 of ring 13 along a circumferential direction 27 of diaphragm assembly 1.

In FIG. 3, diaphragm assembly 1 according to the disclosure is arranged in a second position 29. This is further shown in FIG. 4 by way of the sectional view shown there. Diaphragm assembly 1 can be compressed there in second position 29, where diaphragm body 9 in the process projects into volume space 5.

FIG. 4 there shows a sectional view along a plane which is identified in FIG. 3 by the dashed line IV-IV and projects perpendicularly from the image plane. The sectional view shown in FIG. 3 is there to be understood as a radially symmetrical sectional view through diaphragm assembly 1. This means in particular that the plane which is identified by the dashed line IV-IV in FIG. 3 can be rotated about any random angle 31 and a sectional view along this rotated plane would again correspond to the sectional view shown in FIG. 4.

The features described above of diaphragm assembly 1 in first position 3 according to FIGS. 1 and 2 apply analogously to the features of diaphragm assembly 1 in second position 29 according to FIGS. 3 and 4. However, the following additional features regarding the interaction of ring 13 with diaphragm 7 in second position 29 of diaphragm body 9 should be emphasized.

In particular, when diaphragm body 9 is arranged in second position 29, ring 13 can be surrounded by outer surface 23 of diaphragm 7 at least in part, as is shown by way of example in FIG. 4. Diaphragm body 9 can then compress volume space 5. Surface section 21 of ring 13, which is now surrounded by diaphragm 7, can preferably be formed as a smooth surface. The section of ring 13 disposed opposite smooth surface section 21 can either also be formed to have a smooth surface or can also have a rough surface. Ring 13 can in particular be produced inexpensively in that at least surface section 21 is formed as a smooth surface, in particular by polishing, where other surface sections of ring 13 can remain untreated. When ring 13 is surrounded by outer surface 23 of diaphragm 7 at least in part, diaphragm 7 can have a bending radius 34 which can correspond to at least a radius of cord cross section 19 of ring 13. This has an effect on diaphragm 7 that, in particular, limits bending.

Figure 5:
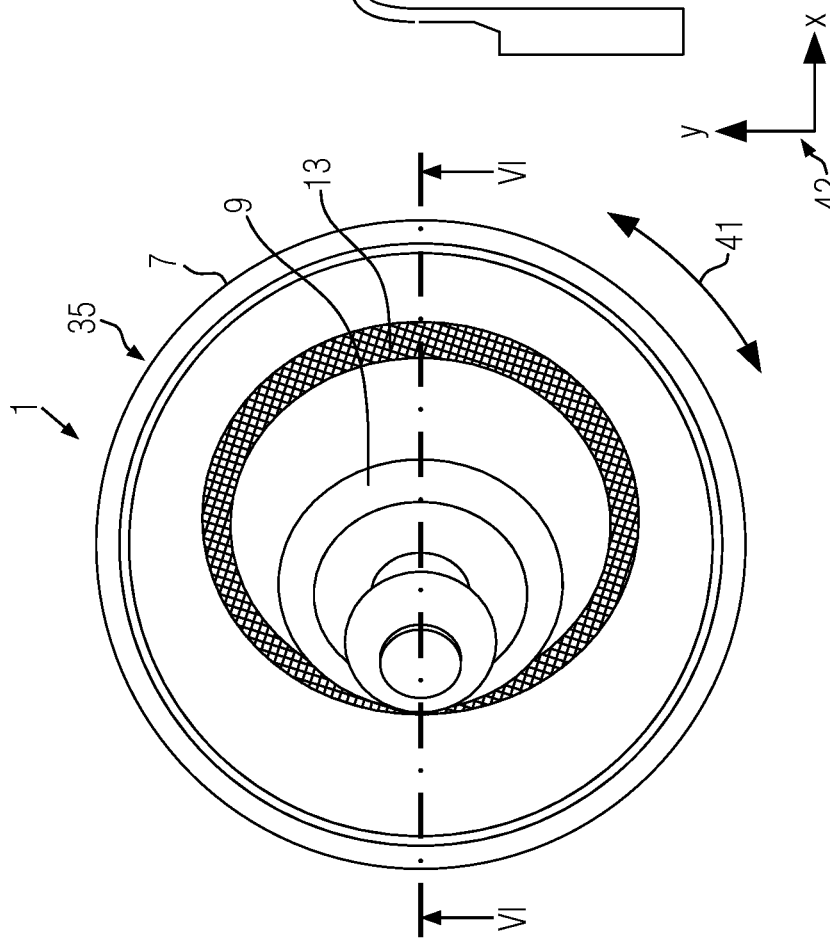
FIG. 5 is a top view showing the diaphragm assembly according to the disclosure in a third position.

In FIG. 5, diaphragm assembly 1 according to the disclosure is arranged in a third position 35. This is further illustrated in FIG. 6 by way of the sectional view shown there. Diaphragm assembly 1 can be elongate in part and compressed in part in third position 35, or diaphragm assembly 1 can be less compressed in third position 35 than in second position 29. Diaphragm body 9 can protrude at least in part into volume space 5. In particular, the arrangement of diaphragm assembly 1 in third position 35 elongated in part and compressed in part can be made possible by tilting diaphragm body 9.

Figure 6:
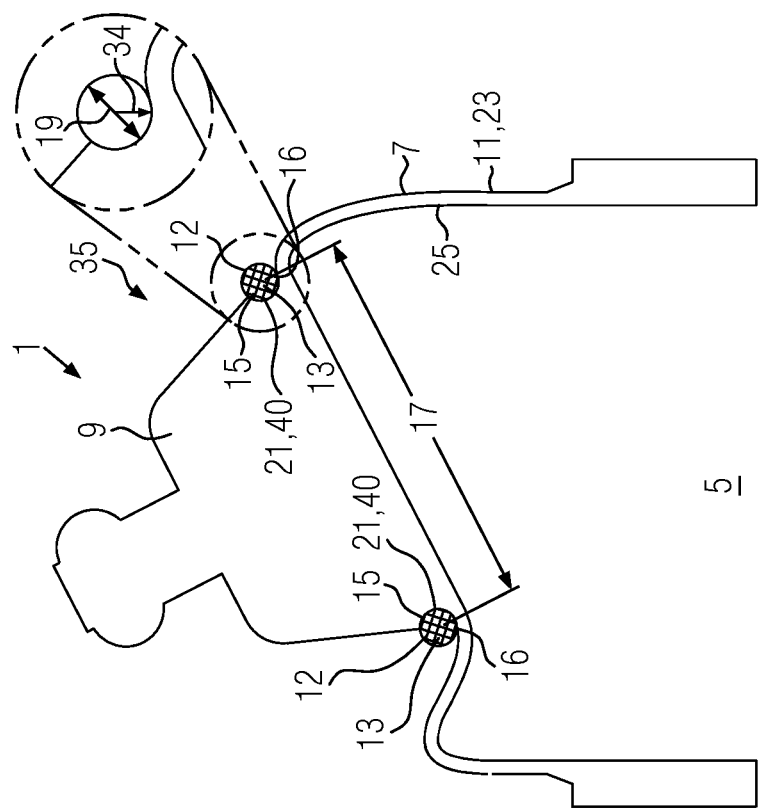
FIG. 6 is a sectional view through the diaphragm assembly according to the disclosure from FIG. 5 along a plane which is identified by the dashed line VI-VI in FIG. 5 and projects perpendicularly from the image plane.

FIG. 6 there shows a sectional view along a plane which is identified in FIG. 5 by the dashed line VI-VI and projects perpendicularly from the image plane.

Third position 35 of diaphragm assembly 1 means in particular that diaphragm body 9 is arranged in a third position 35. The features described above of diaphragm assembly 1 in first position 3 and in second position 29 according to FIGS. 1 to 4 apply analogously to the features of diaphragm assembly 1 in third position 35 according to FIGS. 5 and 6. However, the following additional features regarding the interaction of ring 13 with diaphragm 7 in third position 35 of diaphragm body 9 should be emphasized. When diaphragm body 9 is arranged in third position 35, diaphragm body 9 can be arranged in particular between first position 3 and second position 29, as is shown in FIG. 6. In this case, in third position 35 of diaphragm body 9, ring 13 can be surrounded at least in part by outer surface 23 of diaphragm 7, as is shown in FIG. 6. When ring 13 is surrounded at least in part by outer surface 23 of diaphragm 7, diaphragm 7 can have a bending radius 34 which can correspond to at least a radius of cord cross section 19 of ring 13. This has an effect on diaphragm 7 that, in particular, limits bending. Furthermore, diaphragm body 9, when arranged in third position 35, can compress volume space 5. Volume space 5 can be maximally compressed, for example, in second position 29 and minimally or less than maximally compressed in first position 3, or ideally not compressed in first position 3, respectively. In third position 35, volume space 5 can be compressed in such a way that a compression of volume space 5 can be obtained which can be between a first compression of volume space 5 in first position 3 and a second compression of volume space 5 in second position 29

In particular, diaphragm body 9 can be configured to be tiltable relative to diaphragm 7 in all three positions 3, 29, or 35. However, diaphragm body 9 does not need to be tilted. Tilting diaphragm body 9 is preferably intended in third position 35 of diaphragm body 9, as shown in FIG. 6. Tilting diaphragm body 9 in third position 35 can lead to diaphragm body 9 being able to be arranged in particular between first position 3 and second position 29, as is shown in FIG. 6. Diaphragm 7 in a tilted assembly of diaphragm body 9 can preferably be configured to surround ring 13 at least in part. This is shown in FIG. 6 with reference to surface section 21 of ring 13. When diaphragm body 9 is tilted, surface section 21 can be surrounded to a greater extent by diaphragm 7 than surface section 21 at a different location of ring 13, where surface section 21 can abut at least against outer surface 23 of diaphragm 7.

As already described above, surface 21, which can be surrounded by diaphragm 7, can be configured as a smooth surface. The section of ring 13 disposed opposite smooth surface section 21 can either also be formed to have a smooth surface or can also have a rough surface. Ring 13 can in particular be produced inexpensively in that at least surface section 21 is formed as a smooth surface, in particular by polishing, where other surface sections of ring 13 can remain untreated. If ring 13 is surrounded at least in part by outer surface 23 of diaphragm 7, diaphragm 7 can have a bending radius 34 which can correspond to at least a radius of cord cross section 19 of ring 13.

Although ring 13 in third position 35 of diaphragm body 9 can abut preferably completely against outer surface 23 of diaphragm 7, outer surface 23 can be configured to lose contact to at least a partial section 40 of surface portion 21 of ring 13 when diaphragm body 9 is strongly tilted. In particular, outer surface 23 can lose contact at least to partial section 40 of surface portion 21 of ring 13 along a circumferential direction 41 of diaphragm assembly 1. The person skilled in the art understands that diaphragm body 9 can be tilted in any other direction, where a direction in preferably an x-y plane of a coordinate system 42 can be intended. Such tilting can have a corresponding effect on diaphragm assembly 1 as described above for a tilted assembly of diaphragm body 9 and as shown in FIGS. 5 and 6.

Figure 7:
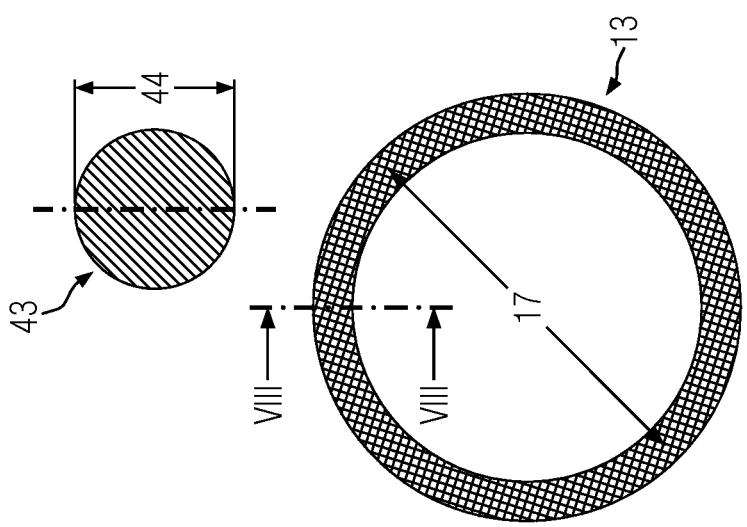
FIG. 7 is a sectional view showing a ring, in particular an O-ring, without injection points and a cross-section through the O-ring at the point indicated by the line VIII-VIII.

FIG. 7 shows a top view onto ring 13 as well as a cord cross section 43 through ring 13 along the dashed line VIII-VIII Cord cross section 43 of ring 13 can have a diameter 44 in a range from 0.5 mm to 20 mm. Furthermore, ring 13 can have a diameter (mean value between the outer and inner diameter) 17, which can be in a range from 5 mm to 100 mm. Ring 13 can be an O-ring and comprise rubber or plastic material. However, ring 13 can also be metallic and preferably comprise stainless steel, copper, or brass. The O-ring which can comprise rubber or plastic material can comprise the material ethylene-propylene-diene rubber (EPDM) or the material polybutylene terephthalate (PBT). The O-ring preferably comprises rubber and is formed to be deformable. The O-ring made of rubber can moreover preferably be less hard than a corresponding O-ring made of plastic material. The O-ring made of plastic material can preferably be formed to not deform or can only be deformed with difficulty in order to form a more rigid diaphragm assembly 1.

Figure 8:
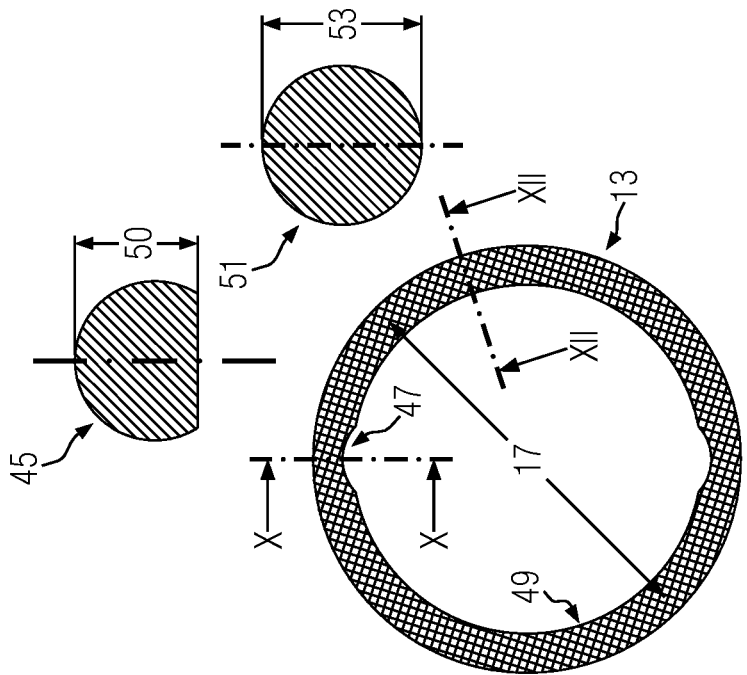
FIG. 8 is a sectional view showing a ring, in particular an O-ring, with two injection points on an inner edge of the O-ring and a cross-section through the O-ring at the point indicated by the line X-X.

FIG. 8 shows a top view onto a further embodiment of ring 13 as well as a cord cross section 45 through ring 13 along the dashed line X-X. Ring 13 can preferably be formed as an O-ring made of plastic material and, as shown in FIG. 8, comprise at least one injection point 47 which is formed on an inner edge 49 of the O-ring made of plastic material. Cord cross section 45 along the dashed line X-X can have a diameter 50 and represents cord cross section 45 along at least one injection point 47. Furthermore, FIG. 8 shows a cord cross section 51 along the dashed line XII-XII. Cord cross section 51 can have a diameter 53. Diameter 50 can there be smaller than diameter 53 since cord cross section 45 can be smaller due to injection point 47. Outside injection point 47, the O-ring can again have an approximately round cord cross section, as is illustrated by cord cross section 51. In this case, approximately round cord cross section 51 is not deformed by an injection point that reduces the cross section. In particular, it can be seen from FIG. 8 that cord cross section 45 of ring 13 and a cord cross section of ring 13 generally do not have to be round, but the cord cross section can be deformed and in particular deviate from a round shape.

FIG. 9 shows a seat assembly 101 which can comprise a seat 102, in particular a vehicle seat. Seat assembly 101 can further comprise a seat surface 103, a backrest 105, and air bladder assemblies 106. Seat assembly 101 can furthermore comprise diaphragm assembly 1 according to the disclosure which can be arranged in seat assembly 101 or adjacent to seat assembly 101, as is shown in FIG. 9. Seat assembly 101 can furthermore comprise a control device 107 which can be in pneumatic contact with air bladder assemblies 106. In particular, control device 107 can be configured to open or close a pneumatic contact to one of air bladder assemblies 106, or control device 107 can be configured to open or close a pneumatic contact to several air bladder assemblies 106. Diaphragm assembly 1 according to the disclosure can furthermore comprise an actuator 109 which engages in diaphragm body 9. In particular, control device 107 can be configured to actuate actuator 109. Furthermore, diaphragm assembly 1 can be in pneumatic contact with control unit 107. Diaphragm assembly 1 can be in pneumatic contact by way of control device 107 with an air bladder assembly 106, or diaphragm assembly 1 can be in pneumatic contact with several air bladder assemblies 106. Furthermore, the pneumatic contact between diaphragm assembly 1 and an air bladder assembly 106, or the pneumatic contact between diaphragm assembly 1 and several air bladder assemblies 106 can be separated by control device 107.

Figure 11:
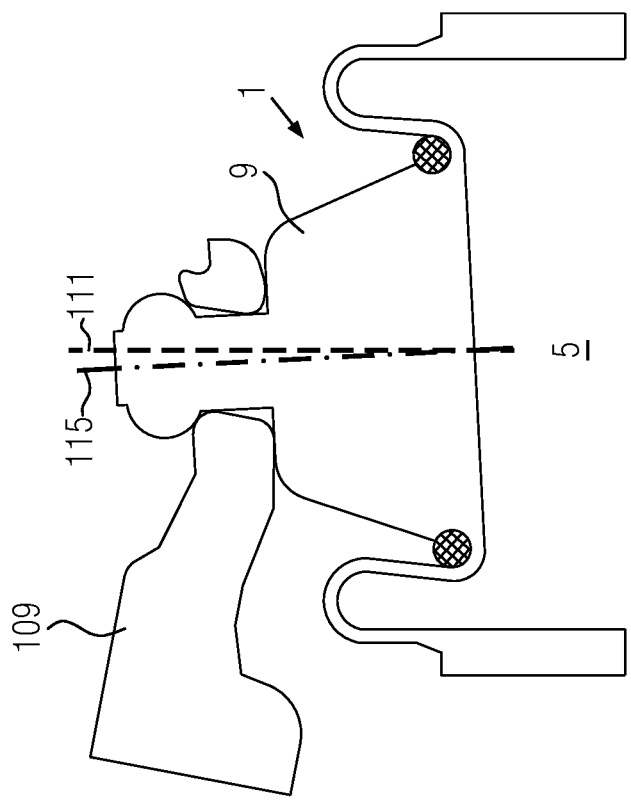
FIGS. 10 and 11 are schematic side views showing a sequence of motions of the diaphragm assembly according to the disclosure, where an actuator engages with the diaphragm body.
Figure 10:
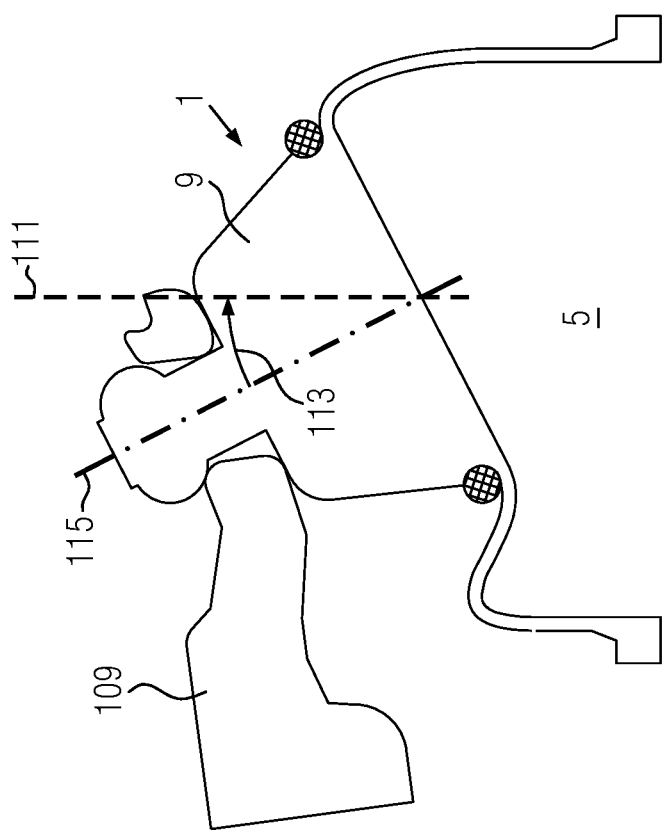

An embodiment of diaphragm assembly 1 according to the disclosure is shown in FIGS. 10 and 11 together with actuator 109 engaging in diaphragm body 9. Actuator 109 there can be arranged to be tiltable, where tilting can be possible at least relative to a longitudinal axis 111. Furthermore, actuator 109 can be configured to transform a rotational motion to a translatory motion. The translatory motion can preferably lead to diaphragm body 9 that is connected to actuator 109 executing a translatory motion at least along longitudinal axis 111 and actuator 109 additionally being able to guide diaphragm body 9 through an angle range which can comprise angle values 113 within an interval of 0 degrees up to 40 degrees Angle values 113 can be contained between an axis of symmetry 115 of diaphragm body 9 and longitudinal axis 111. In particular, FIG. 10 shows a laterally inclined diaphragm body 9 and FIG. 11 shows a diaphragm body 9, the axis of symmetry 115 of which is at most slightly inclined relative to longitudinal axis 111 and which has furthermore been moved translationally along longitudinal axis 111.

Such a motion of diaphragm body 9 can cause a motion that compresses volume space 5. If seat assembly 101 comprises diaphragm assembly 1 described above, a massage function can then be made possible in seat assembly 101 by the action upon air bladder assemblies 106, as described above. In particular, actuator 109 could move diaphragm assembly 1 at least through the above-described first position 3, second position 29, and third position 35, which are shown in FIGS. 1-6. The reversibly compressing motion of volume space 5, that can be performed by actuator 109 and diaphragm body 9, can comprise a continuous motion of diaphragm body 9. As a result, diaphragm body 9 can be moved through first position 3, second position 29, and third position 35.

Furthermore, diaphragm assembly 1 described above has been viewed as a single assembly for the purpose of simplifying the description. On the other hand, four or more than four diaphragm assemblies 1 can be arranged symmetrically, i.e. square or "cloverleaf-like", in an installation position not shown in detail. In diaphragm assembly 1 shown in FIGS. 1 to 6, as well as 10 and 11, the former is shown in different positions that can be caused by actuator 109. In particular, the installation position described above with four or more than four diaphragm assemblies 1 could comprise a motion of diaphragm assemblies 1, where diaphragm assemblies 1 can be moved sequentially through first, second, and third positions 3, 29 and 35 described above.

Figure 12:
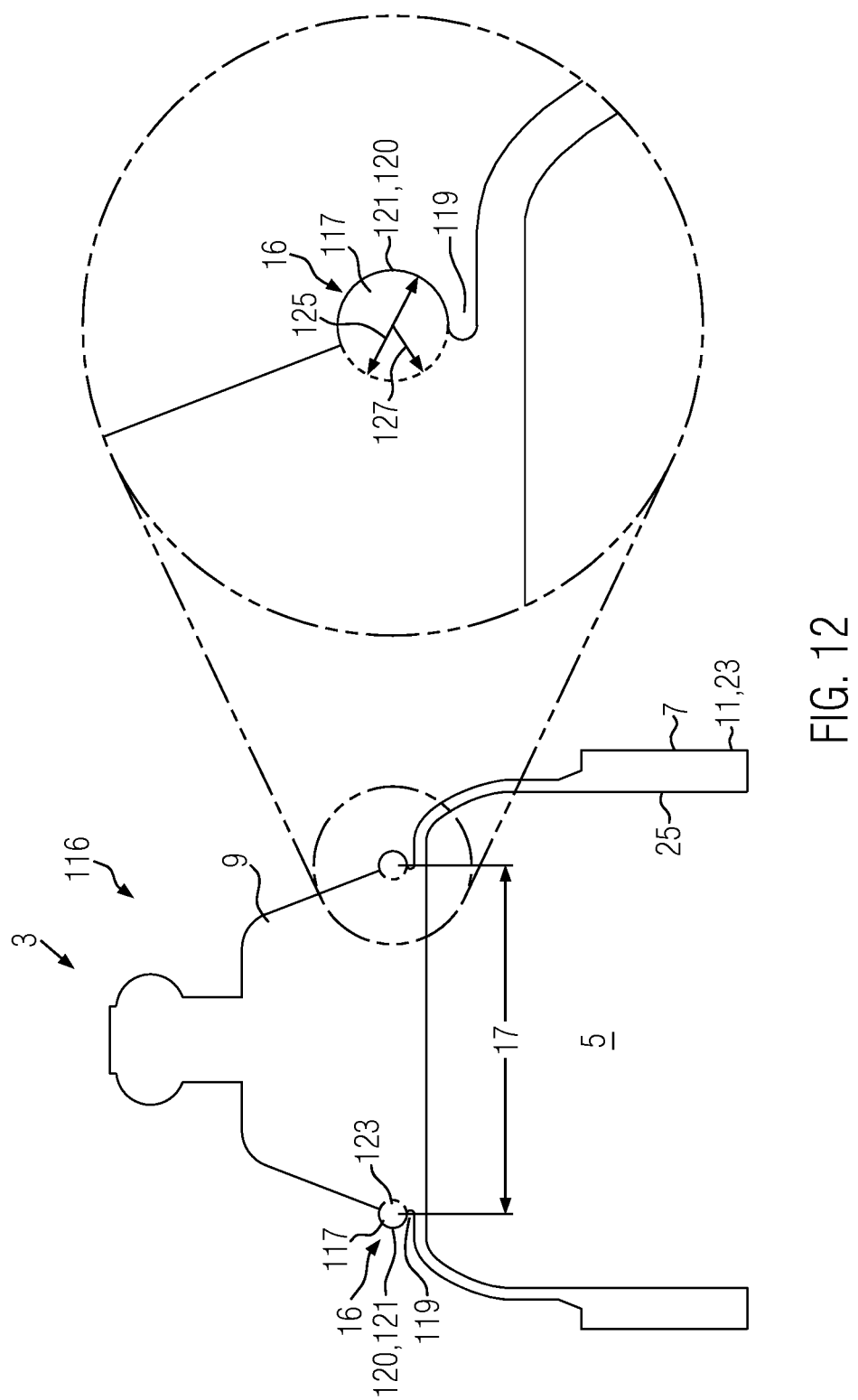
FIG. 12 is a schematic side view showing an embodiment of the diaphragm assembly according to the disclosure with a ring formed integrally with the diaphragm body.

A further embodiment of a diaphragm assembly 116 according to the disclosure is shown in FIG. 12 with a ring 117 which is formed integrally with diaphragm assembly 116. Diaphragm assembly 116 can comprise at least the motions of diaphragm assembly 1 described above. For example, diaphragm assembly 116 is shown in FIG. 12 in first position 3 described above, where the diaphragm assembly could also be arranged in positions 29 and 35. In particular, at least the above-described interaction of diaphragm 7 and ring 13 can also be expected for diaphragm 7 and ring 117 and is to be understood analogously to the above description of diaphragm assembly 1 for diaphragm assembly 116.

Diaphragm assembly 116 can furthermore comprise depressions in the form of notches 119 for minimizing material stresses in the region of diaphragm 7. Notches 119 are there provided adjacent to volume space 5 below ring 117. Furthermore, surface section 120 of ring 117 can form convex abutment contour 121. Surface section 120 is there to be understood to mean any section of an outer surface of ring 117 and is not to be understood to be restricted to only one surface section. Surface section 120 is preferably configured as a smooth surface. Ring 117 can preferably be arranged integrally with diaphragm assembly 116 using the casting method described above. Ring 117 can be embedded in part in transition region 16 into diaphragm body 9. Ring 117 can there further comprise a cord cross section 123 having a diameter 125 in a range from 0.5 mm to 20 mm. If ring 117 is surrounded at least in part by outer surface 23 of diaphragm 7, diaphragm 7 can have a bending radius 127 which can correspond to at least a radius 127 of cord cross-section 123 of ring 117. This has an effect on diaphragm 7 that, in particular, limits bending.

Figure 13:
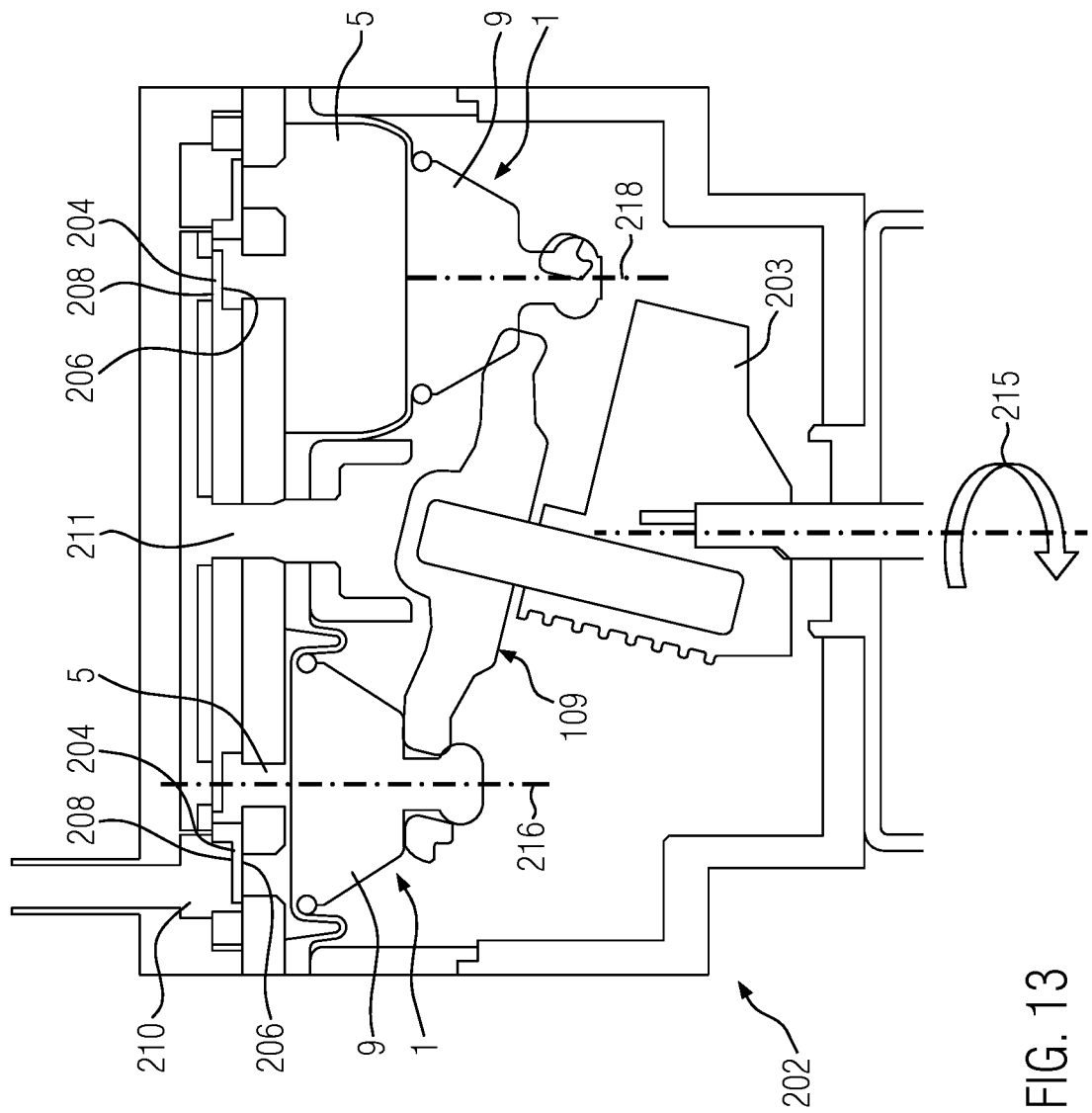
FIG. 13 is a schematic side view showing a pump assembly which includes at least one diaphragm assembly.

FIG. 13 shows a pump assembly 202 according to the disclosure which comprises at least one diaphragm assembly 1. Furthermore, pump assembly 202 can comprise actuator 109. Actuator 109 there acts on diaphragm body 9 as described above, where actuator 109 can be driven by a rotor 203.

Pump assembly 202 can comprise at least one valve 204 which can be arranged with a first side 206 of valve 204 adjacent to volume space 5 of diaphragm assembly 1. Valve 204 can be arranged with a second side 208 of valve 204 adjacent on a duct 210, 211. Valve 204 can comprise rubber and be configured as a flap valve. In the event of a motion of diaphragm body 9 that compresses volume space 5, a fluid disposed in volume space 5 can flow out into duct 210 via an outflow direction 212, i.e. volume space 5 can be vented when valve 204 is in an open state. Duct 210, 211 can be connected to a pump outlet or pump inlet (not shown in detail), where duct 210, 211 can be filled or vented by a switchable valve (not shown in detail). If valve 204 remains in a closed state at least temporarily during a motion of diaphragm body 9 that compresses volume space 5, then pump assembly 202 has a compressing effect with which the fluid disposed in volume space 5 can be compressed. With a motion of diaphragm body 9 that expands volume space 5, volume space 5 can be filled with a fluid via an inflow direction 214 when valve 204 is in an open state. Volume space 5 can be filled via duct 211. Outflow direction 212 and inflow direction 214 are no directional directions, but are to be viewed as bidirectional directions, depending on the respective pump cycle. Outflow direction 212 can therefore become an inflow direction when diaphragm body 9 performs a motion that expands volume space 5. Accordingly, inflow direction 214 can become an outflow direction when diaphragm body 9 performs a motion that compresses the volume space.

In particular, valve 204 can be opened or closed by a pressure difference between volume space 5 and duct 210, 211. If a pressure in volume space 5 is greater than a pressure in duct 210, 211, then valve 204 can be opened in the direction of duct 210, 211. If a pressure in duct 210, 211 is greater than a pressure in volume space 5, then valve 204 can be opened in the direction of volume space 5.

Rotor 203 can preferably move along a direction of rotation 215 or the rotor can move in a direction opposite to direction of rotation 215 and thereby transmit a force to actuator 109.

A volume flow can be doubled by a second diaphragm assembly 1 in pump assembly 202, as shown in FIG. 13, where the volume flow can be quantified by way of an amount of outflowing fluid per unit of time. The mode of operation described above of pump assembly 202 is there to be applied analogously.

Pump assembly 202 shown in FIG. 13 illustrates diaphragm bodies 9 of two diaphragm assemblies 1 in first position 3 and in second position 29, where diaphragm bodies 9 in the embodiment of pump assembly 202 shown can be configured to be tiltable in first 3, in second 29, or in third position 35 relative to diaphragm 7.

Another embodiment of pump assembly 202 described above can comprise an actuator 109 which can transmit a linear motion to diaphragm body 9 and does not tilt the latter in the process. In this case, diaphragm body 9 would be able to move along longitudinal axes 216, 218 relative to diaphragm 5 and not be tilted relative to longitudinal axis 111, as shown in FIG. 10.

The invention claimed is:

1. A diaphragm assembly comprising:
    a diaphragm having a flexible wall with a first end configured to for attachment to a housing and a second end spaced from the first end, the diaphragm defining a volume space within the flexible wall;
    a diaphragm body having a base extending from the second end of the diaphragm, the base of the diaphragm body having an inner side facing and sealing the volume space, the diaphragm body having an engagement portion extending in a direction away from the inner side for engagement with an actuator external to the volume space, the diaphragm body configured as a non-hollow body and further comprising a circumferential surface on an outer side extending from the second end of the diaphragm to the engagement portion; and
    a convex abutment contour arranged to project from the circumferential surface of the diaphragm body, the convex abutment contour including a ring encircling the circumferential surface of the diaphragm body, the diaphragm body connecting to the second end of the diaphragm adjacent the ring but not through the ring,
    wherein when the diaphragm body is translated and/or tilted relative to the diaphragm, the convex abutment contour on the diaphragm body limits a bending radius of the second end of the diaphragm.

2. The diaphragm assembly according to claim 1, wherein the diaphragm and the diaphragm body are formed integrally and the diaphragm body closes off the volume space in a fluid-tight manner, or wherein the diaphragm and the diaphragm body are formed separately and connected to one another in a fluid-tight manner.

3. The diaphragm assembly according to claim 1, wherein the ring is formed separately from the diaphragm body, or wherein the ring and the diaphragm body are formed integrally.

4. The diaphragm assembly according to claim 1, wherein the diaphragm body circumferential surface defines a notch between the ring and the diaphragm for minimizing material stresses in the region of the diaphragm.

5. The diaphragm assembly according to claim 1, wherein the convex abutment contour is formed as a smooth surface.

6. The diaphragm assembly according to claim 1, wherein the ring is an O-ring and includes one of a rubber material or a plastic material, or wherein the ring is metallic and includes one of stainless steel, copper, or brass.

7. The diaphragm assembly according to claim 6, wherein the O-ring includes the plastic material and defines at least one injection arranged on an inner edge of the O-ring.

8. The diaphragm assembly according to claim 6, wherein the O-ring includes one of ethylene-propylene-diene rubber (EPDM) or polybutylene terephthalate (PBT).

9. The diaphragm assembly according to claim 1, wherein a cord cross section of the ring has a diameter in a range from 0.5 mm to 20 mm.

10. The diaphragm assembly according to claim 1, wherein a diameter of the ring is in a range from 5 mm to 100 mm.

11. The diaphragm assembly according claim 1, wherein the diaphragm includes an outer surface and an inner surface, wherein the diaphragm body can be arranged in a first position or in a second position, wherein the diaphragm abuts at least in part against the convex abutment contour when the diaphragm body is disposed in the first position, wherein the diaphragm surrounds the convex abutment contour at least in part when the diaphragm body is disposed in the second position, and
    wherein the diaphragm body can furthermore be disposed in a third position between the first position and the second position, wherein the diaphragm can surround the convex abutment contour at least in part when the diaphragm body is disposed in the third position.

12. The diaphragm assembly according to claim 11, wherein the convex abutment contour, which is surrounded by the diaphragm at least in part, is formed as a smooth surface.

13. The diaphragm assembly according to claim 11, wherein the diaphragm body is formed to be tiltable in the first position, the second position, or the third position relative to the diaphragm.

14. The diaphragm assembly according to claim 13, wherein the outer surface of the diaphragm in a tilted arrangement of the diaphragm body is configured to surround the convex abutment contour at least in part.

15. The diaphragm assembly according to claim 11, wherein the diaphragm body is formed to perform a linear motion, wherein the linear motion displaces the diaphragm body along a longitudinal axis from the first position to the second position or from the second position to the first position.

16. The diaphragm assembly according to claim 11, wherein the diaphragm surrounding the convex abutment contour at least in part has a bending radius which corresponds at least in part to a radius of a cord cross section of the convex abutment contour.

17. The diaphragm assembly according to claim 11, wherein the outer surface of the diaphragm is configured to lose contact with at least a partial section of the convex abutment contour when the diaphragm body is disposed in the first position.

18. A seat assembly comprising a seat, wherein the seat comprises the diaphragm assembly according to claim 1 and an actuator configured to be in engagement with the diaphragm body and to perform a motion with the diaphragm body that compresses the volume space.

19. A pump assembly comprising at least one diaphragm assembly according to claim 1.

20. The diaphragm assembly according to claim 1, wherein the diaphragm body circumferential surface defines a groove, the ring being disposed in the groove.

21. The diaphragm assembly according to claim 20, wherein the diaphragm body defines a notch adjacent the groove and the second end of the diaphragm.

\* \* \* \* \*